J. STEFFENSEN.
Road-Scrapers.

No. 137,499.  Patented April 1, 1873.

Witnesses.  Inventor.

UNITED STATES PATENT OFFICE.

JOHANN STEFFENSEN, OF LYONS, IOWA.

IMPROVEMENT IN ROAD-SCRAPERS.

Specification forming part of Letters Patent No. 137,499, dated April 1, 1873; application filed November 4, 1872.

*To all whom it may concern:*

Be it known that I, JOHANN STEFFENSEN, of Lyons, in the county of Clinton and State of Iowa, have invented certain new and useful Improvements in Road-Scrapers, of which the following is a specification:

The object of my invention is to provide a road-scraper of simple and economical construction, which shall possess the capability of being effectively operated upon uneven ground, and which can be adjusted as required to run over hillocks or elevations on either side of the road, and distribute the earth removed evenly along its track. My improvements are hereinafter fully set forth.

Figure 1:
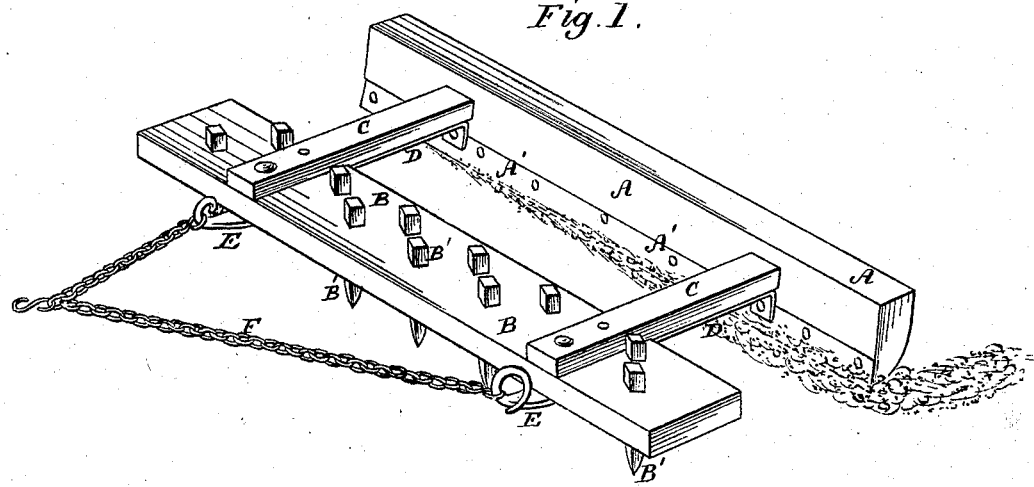
Figure 2:
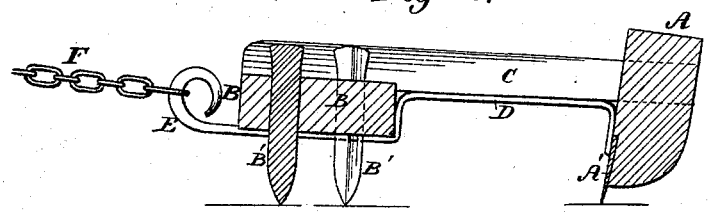

In the accompanying drawing, Figure 1 is a view in perspective of a road-scraper embracing my improvements, and Fig. 2 a vertical central section of the same.

The scraper-beam A, to which the knife A' is properly secured, is rigidly connected to the harrow-beam B by the braces C C, which may be advantageously strengthened by the iron straps D D. The harrow-beam is provided with suitable teeth B', which break up the earth so that it can be readily acted upon by the knife A'. Lugs E E are secured to the harrow-beam near its ends, respectively, in this instance forming prolongations of the straps D D, and a draft-chain, F, has its ends hooked to these lugs. The swingle-tree is connected to the draft-chain at any point in its length that may be required by the conformation of the ground, and by this means the angle of the scraper-knife with the line may be varied at pleasure. For example, if the irregularities of the ground are practically equal on both sides, the swingle-tree will be attached to the draft-chain at the middle of its length, and the scraper will be drawn directly at right angles to the path of the team. When elevations of any considerable extent occur on either side of the roadway the connection of the swingle-tree will be shifted to that side, and the scraper will be drawn at a corresponding angle. The force of the team will then be exerted at the end adjacent to the elevation of the ground, and the earth removed passing along the inclined face presented by the knife will be leveled and evenly distributed. When the elevations are met upon the opposite side the swingle-tree is correspondingly connected. The harrow-teeth serve to loosen and break up the earth, and thereby enable the knife to act upon it readily and with the least possible resistance. As the scraper is attached rigidly to the harrow it will be seen that it will be governed and controlled by the movement of the harrow, and correspondingly inclined with it to the line of draft so as to conform itself to the varying requirements of the work. The construction and mode of connecting the different members are such as to make it a strong and durable machine.

I claim as my invention—

The combination of a road-scraper, a harrow rigidly attached thereto, and a draft-chain connected to the harrow at or near its ends, substantially as set forth.

JOHANN STEFFENSEN.

Witnesses:
E. E. EDDY,
J. C. ROOT.